Feb. 16, 1965

F. E. COMPTON ETAL 3,169,275

SCREW TYPE PREPLASTICIZING PLASTIC
INJECTION MOLDING MACHINE

Filed Oct. 31. 1961

INVENTORS
FRANCIS E. COMPTON
BERNARD D. ASHBAUGH
BY PETER HOLD

Kenyon & Kenyon

ATTORNEYS

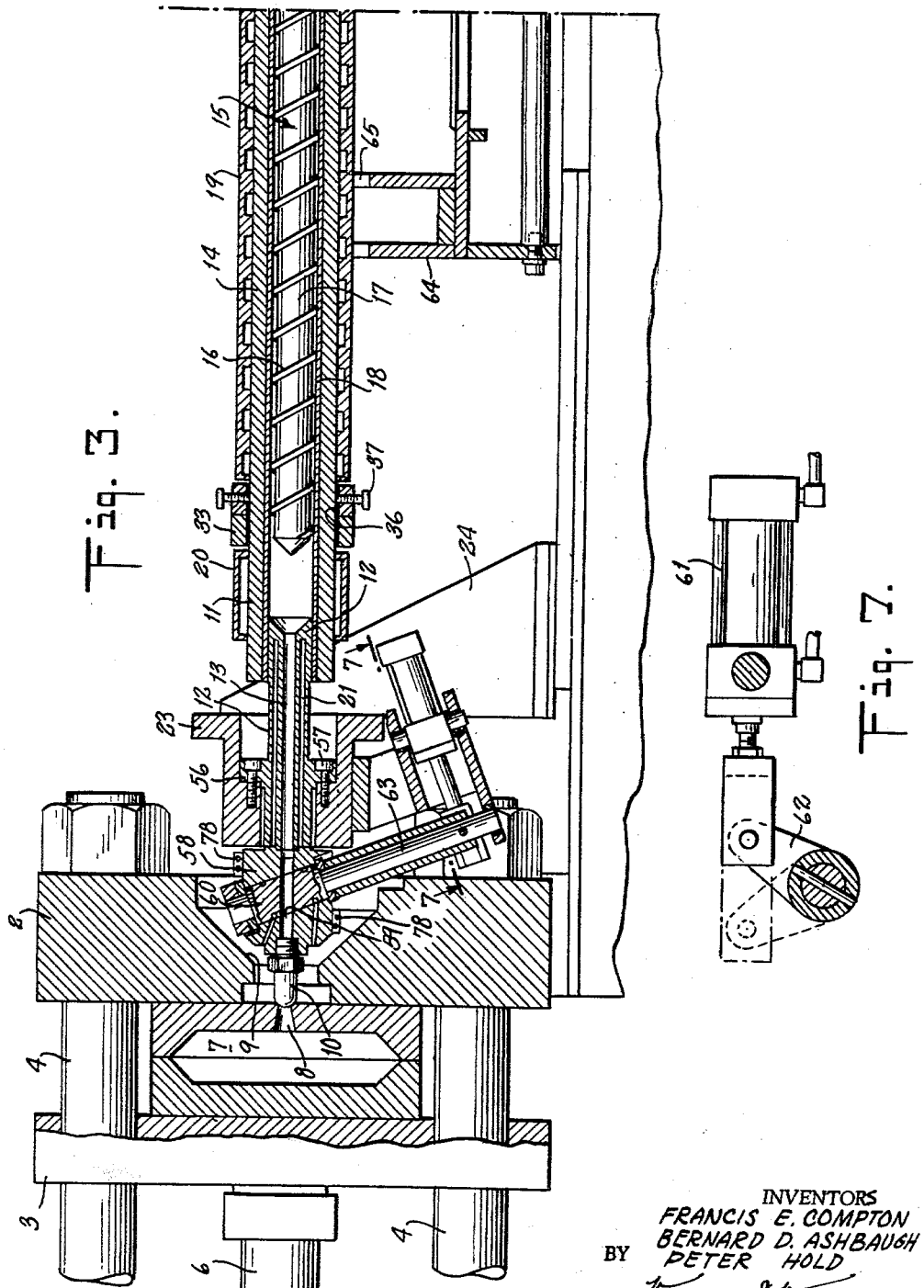

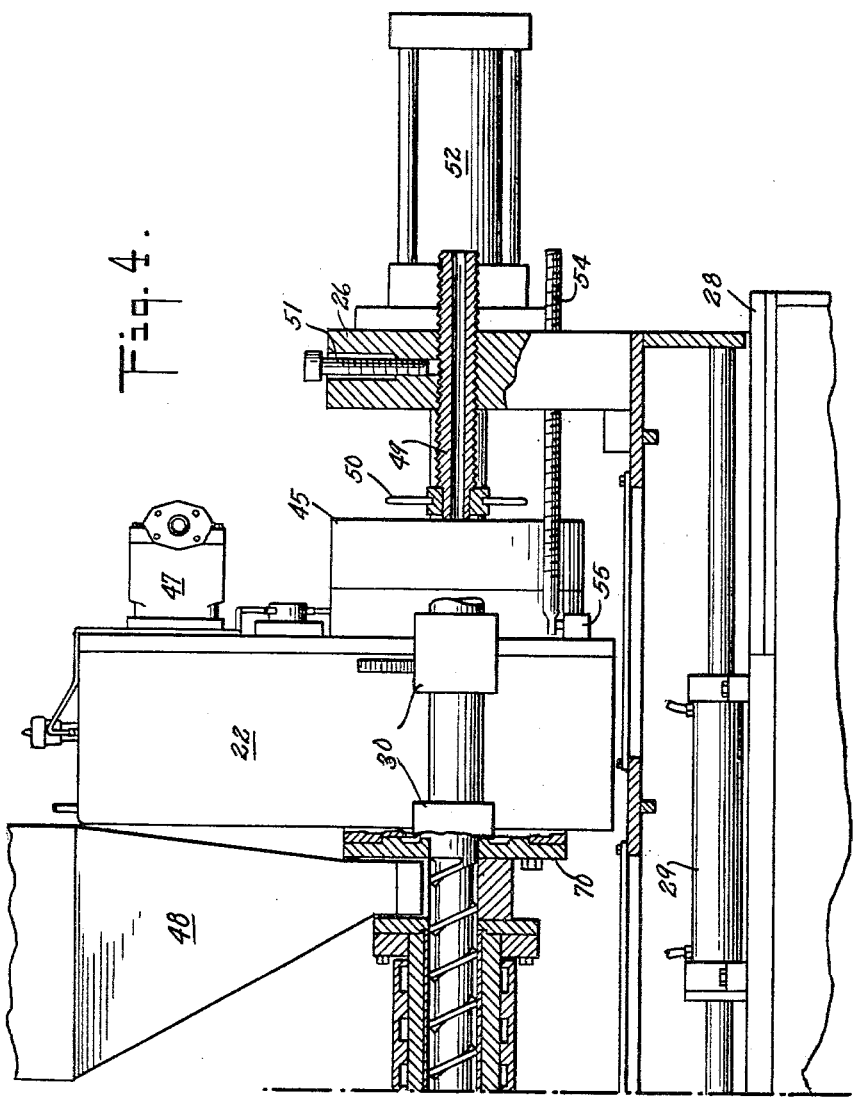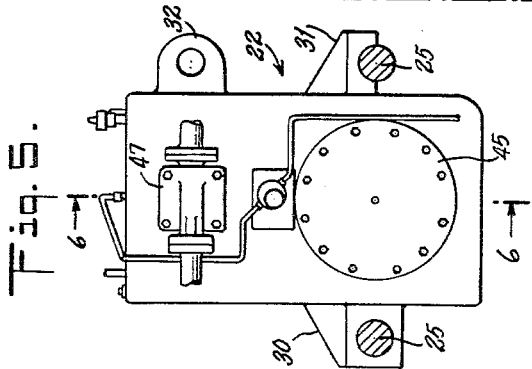

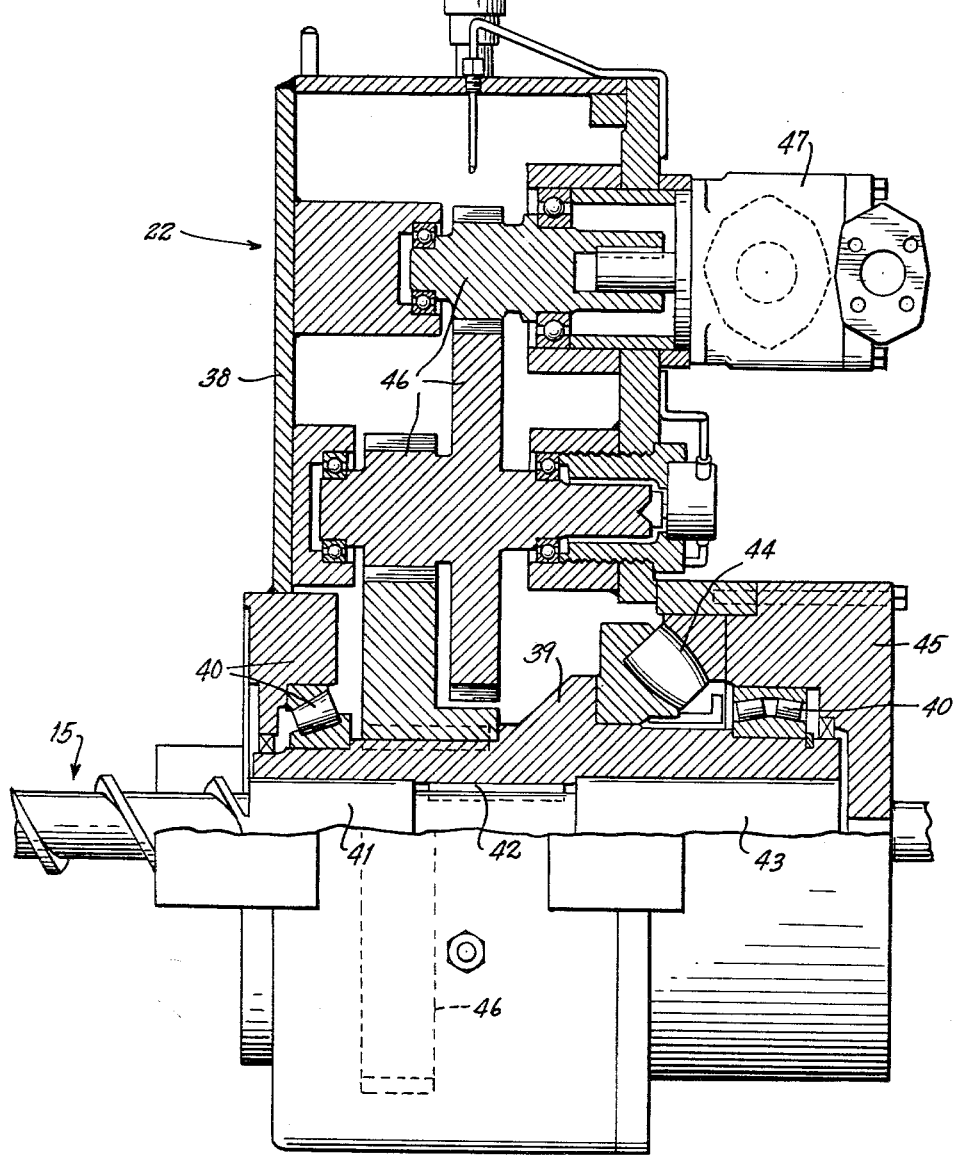

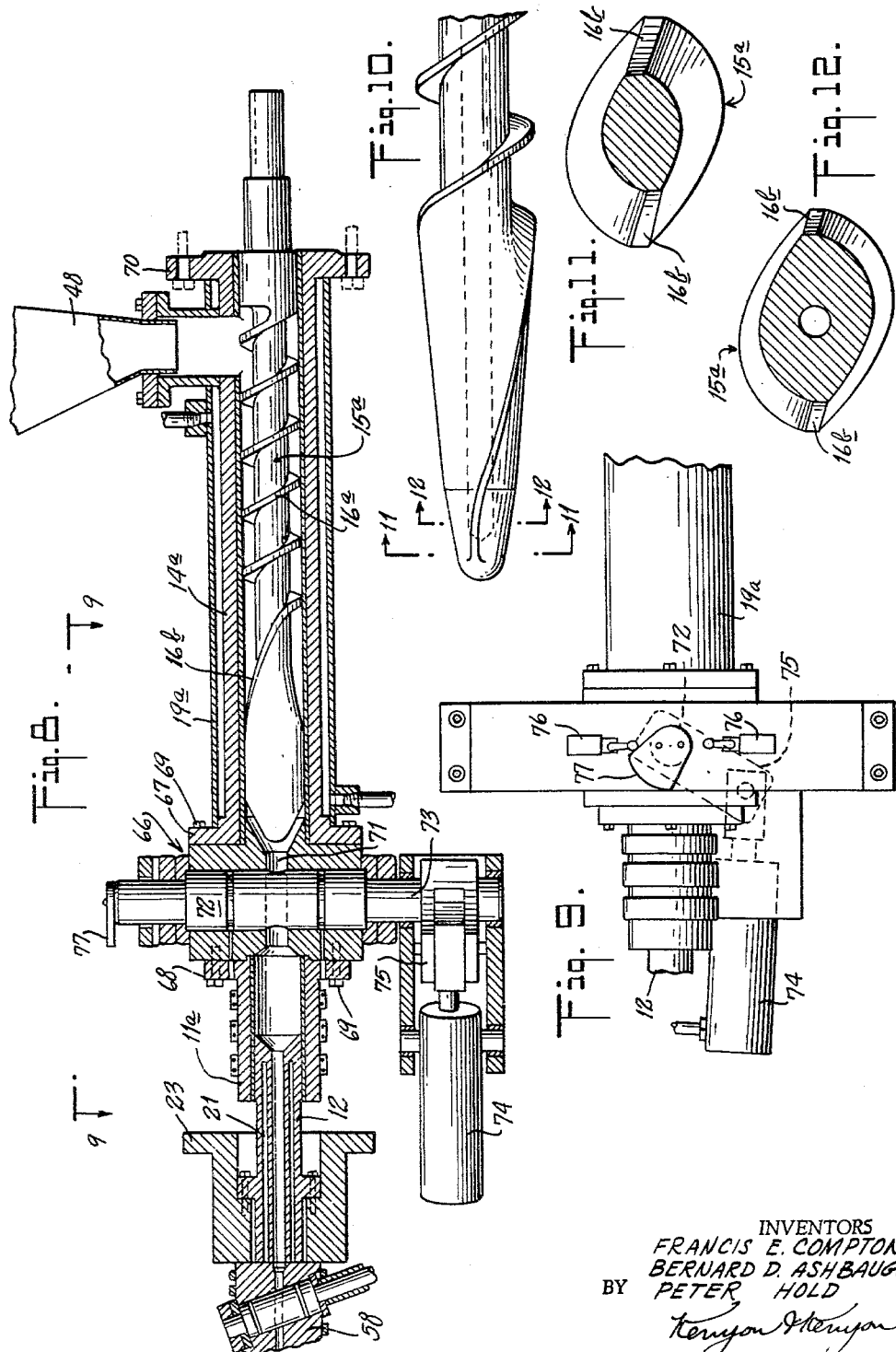

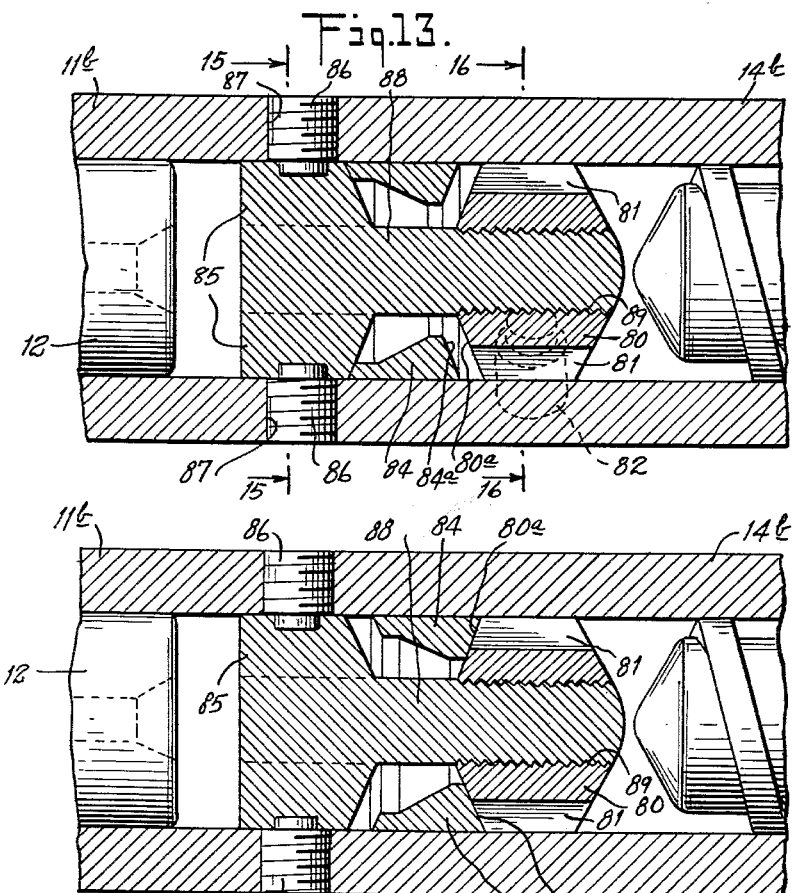
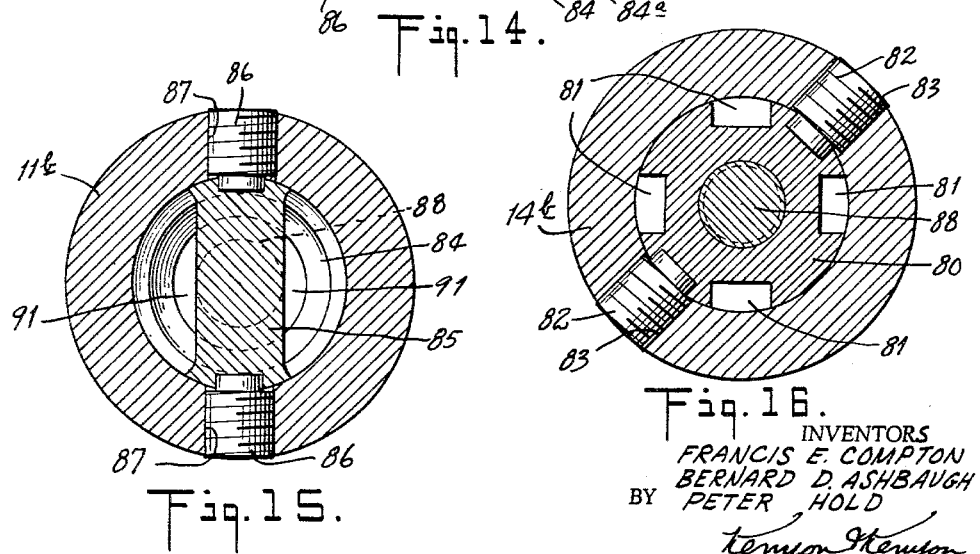

INVENTORS
FRANCIS E. COMPTON
BERNARD D. ASHBAUGH
BY PETER HOLD
ATTORNEYS

United States Patent Office 3,169,275
Patented Feb. 16, 1965

3,169,275
SCREW TYPE PREPLASTICIZING PLASTIC
INJECTION MOLDING MACHINE
Francis E. Compton and Bernard D. Ashbaugh, Rochester, N.Y., and Peter Hold, Milford, Conn., assignors to Farrel Corporation, a corporation of Connecticut
Filed Oct. 31, 1961, Ser. No. 148,896
16 Claims. (Cl. 18—30)

This invention relates to a screw type preplasticizing plastic injection molding machine.

One of the objects is to provide a machine of this type permitting the molding of parts requiring a large volume of plastic. Another object is to provide such a machine in a form capable of handling a wide range of plastic compositions. Other objects may be inferred from the following disclosure.

Referring to the accompanying drawings.

Figure 1:
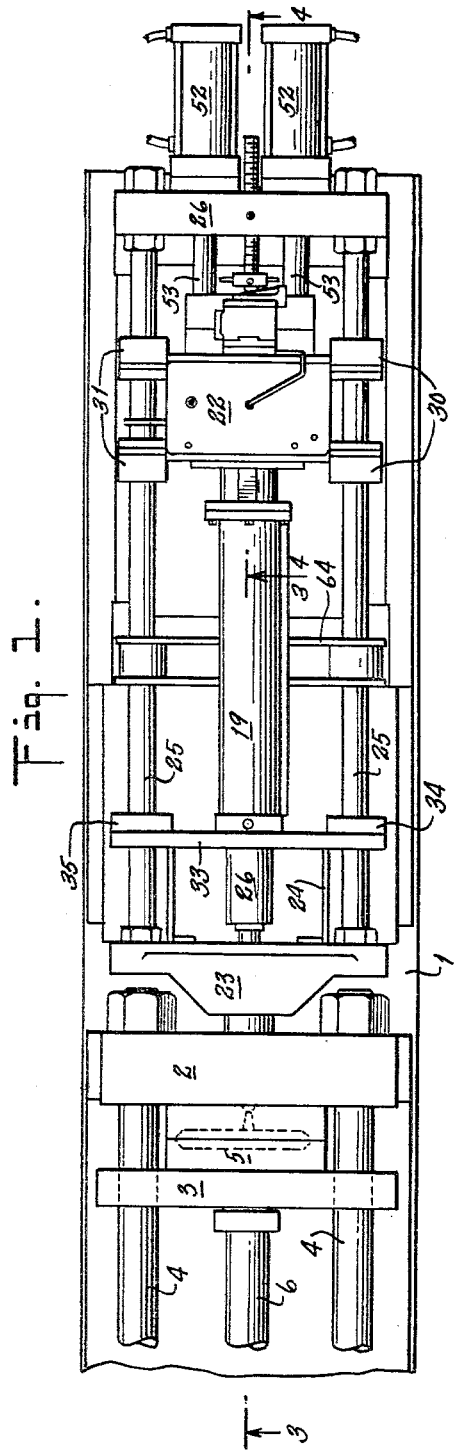
FIG. 1 is a top view of a preplasticizing and injection unit constructed according to the principles of the present invention and installed on what may otherwise be a standard United States type of injection molding machine, the latter's clamp operating means not being shown, to avoid compacting the scale unnecessarily.
Figure 2:
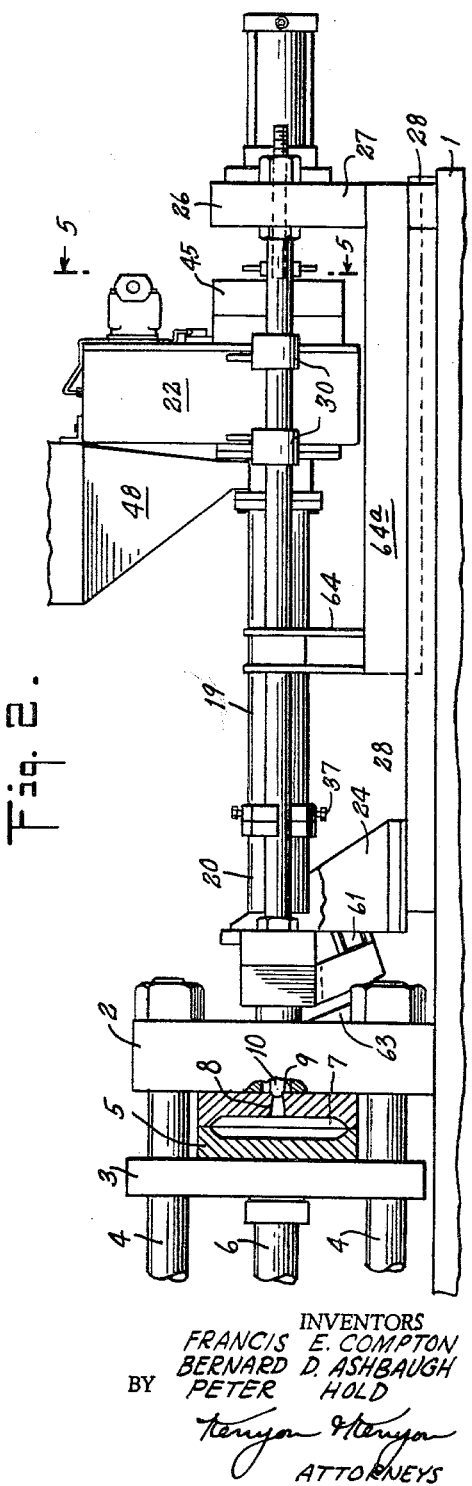
FIG. 2 is a side view of FIG. 1.
Figure 17:
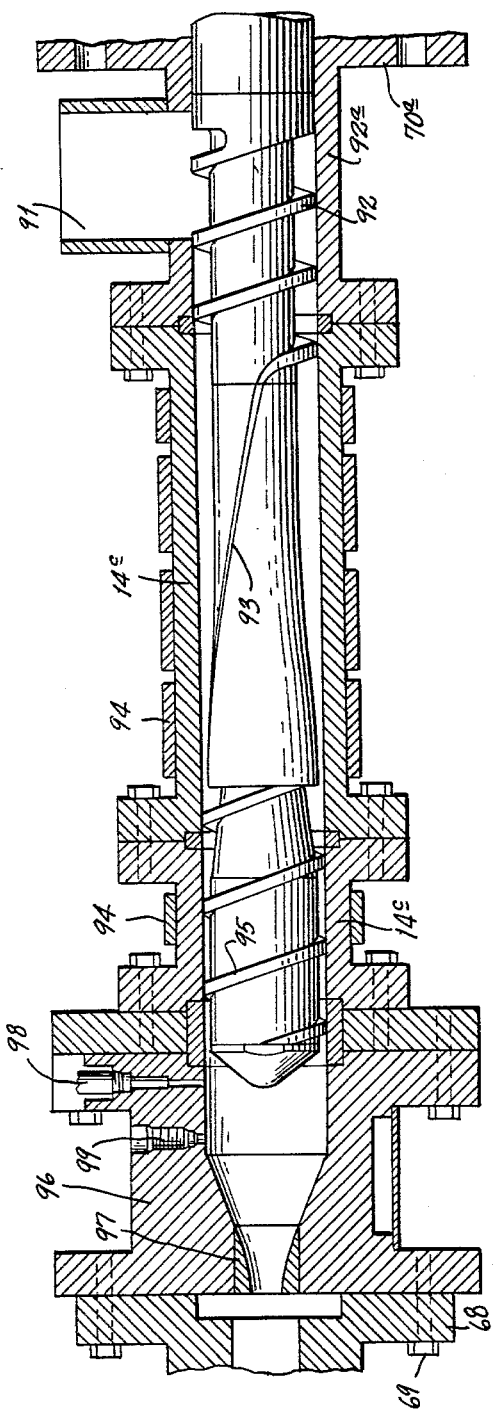

FIGS. 3 and 4 are vertical longitudinal sections taken on the lines 3—3 and 4—4, respectively, in FIG. 1;

FIG. 5 is a cross-section taken on the line 5—5 in FIG. 2;

FIG. 6 is a vertical longitudinal section taken on the line 6—6 in FIG. 5;

FIG. 7 is a cross-section taken on the line 7—7 in FIG. 3;

FIG. 8 is a view corresponding generally to FIGS. 3 and 4 and showing a modification;

FIG. 9 is a top view of a portion of FIG. 8 as indicated by the line 9—9 in this figure;

FIG. 10 is an enlargement showing details of the end of the preplasticizing screw shown in FIG. 8;

FIGS. 11 and 12 are cross-sections taken on the lines 11—11 and 12—12, respectively, in FIG. 10;

FIG. 13 is a vertical longitudinal section showing a portion of FIG. 3 incorporating a modification;

FIG. 14 corresponds generally to FIG. 13, but shows the modification parts in another position;

FIGS. 15 and 16 are cross-sections taken on the lines 15—15 and 16—16, respectively, in FIG. 13; and, FIG. 17 is a vertical longitudinal section showing a modification of the parts shown by FIG. 8.

Referring first to FIGS. 1 and 2, the machine to which this invention is applied includes a base 1, a vertical platen 2, which is immovable relative to the base 1, and a clamp 3 which reciprocates on tie rods 4. The clamp 3 serves to clamp a two-part mold 5, for example, between it and the platen 2, unillustrated equipment being provided to provide the necessary clamping force, to the clamp 3, through a rod 6. The mold 5 has a cavity 7 and a sprue 8, the platen 2 having an opening 9 giving access to this sprue 8 so that an injection nozzle 10 may be pressed thereagainst tightly for the injection of plasticized plastic under high pressure into the cavity 7.

The plastic is supplied through the nozzle 10 by a plastic preplasticizing and injection unit embodying the principles of the present invention.

As shown by FIG. 3, this unit includes an injection cylinder 11 and an injection plunger 12, the latter extending through the left-hand end of the cylinder 11 and having a longitudinally extending plastic passage way 13. A continuation of the cylinder 11 forms a preplasticizing cylinder 14 and, since it is all one cylinder in this instance, this preplasticizing cylinder 14 is in direct plastic contact with the end of the injection cylinder 11 opposite to that through which the injection plunger 12 extends. A plastic feed screw 15 is located in this preplasticizing cylinder 14 for forcing plastic therethrough and into the injection cylinder 11.

Attention is called to the fact that the screw 15 is non-reciprocative relative to the preplasticizing cylinder 14. The outer periphery of this screw's thread 16 has a close fit with the inside of the cylinder 14. The shank 17 of the screw 15 is of relatively large diameter, and when the screw 15 is rotated to feed plastic through the cylinder 14 the plastic feeds in the form of a relatively thin-walled cylindrical helix. The cylinders 11 and 14 are provided with a common liner 18 which may be removed through the left-hand end of the cylinder 11 when wear makes replacement advisable. However, it should be noted that wear is not accelerated by any part which must both rotate and reciprocate while working against the same cylinder area.

The preplasticizing cylinder 14 is shown as heated throughout its length by an encircling heater 19. The injection cylinder 11 is heated throughout its length by an encircling heater 20, and the injection plunger 12 is provided with internal heaters 21. The heaters 21 may be electric resistance heaters, and the heaters 19 and 20 may be of this type or of the hot circulating liquid type. Depending on the plastic composition and the general operating conditions, zone heating may be used so that parts of the cylinders are hotter than other parts.

In connection with the above, it is to be noted that all of the plastic containing parts are capable of carrying heat directly to the plastic, free from interposed moving metallic parts with their attendant troubles.

A gear box 22, discribed in detail hereinafter, mounts the injection cylinder 14 and its screw 15, therefore also including the injection cylinder 11, in the form of a horizontally extending cantilever. This gear box 22 is horizontally reciprocative and means are provided for holding the injection plunger 12 non-reciprocatively relative to the two cylinders and the screw.

Now it becomes apparent that with these reciprocative parts forming an assembly pushed to the left so as to close the space between the end of the screw 15 and the injection plunger 12, that rotation of the screw when supplied with plastic, feeds the plastic along in the form of a very thin-walled helical strip permitting the plastic to absorb heat rapidly from the preplasticizing cylinder, or to give up heat thereto if the latter must be cooled in any manner to control the preplasticizing. As the plastic feeds from the left-hand end of the screw 15 it gradually fills the injection cylinder 11 with plastic while the reciprocative assembly pumps itself to the right.

With the injection cylinder charged with the volume of plastic required to fill the cavity 7 of the previously described mold, the reciprocative assembly consisting of the two cylinders and the screw 15, is forced to the left with enough force to develop the injection molding pressure desired. This is done without relative reciprocation between the screw 15 and the cylinder 14, and, of course, the screw does not reciprocate relative to the cylinder 11. The injection cylinder 11 and its plunger 12 do not introduce new design problems since they function substantially in the conventional fashion during charging and injection. The screw 15 during the injection phase serves only as the rear closure for the injection cylinder 11. Heat from the heater 20 can go directly through the wall of this injection cylinder in the usual fashion. The necessary wall thickness required to confine high injection pressures adequately, is possible. The injection plunger may be designed in substantially the standard fashion since the passage 13 is at the neutral axis of this plunger where it has little effect on column strength. All of the parts which must confine the injection pressure may be made with circumferential surface areas no greater than is necessary in the case of the prior art standard United States injection molding machine constructions. Therefore, excessive radial hydraulic force does not develop.

The means for holding the injection plunger 12 non-reciprocatively, as previously described, comprises a heavy crosshead 23 supported vertically by a pedestal 24 and held against the large displacement forces produced during injection, by tie rods 25 which extend backwardly to beyond the gear box 22 and to a second crosshead 26. This crosshead 26 has a pedestal 27 extending downwardly. The tie rods 25 tie the two crossheads 23 and 26 rigidly together to form an assembly which reciprocates through a short stroke on guide ways 28 on the base 1. This short stroke reciprocation is provided so that the nozzle 10 may be moved to and from its sealing position with the sprue 8 of the mold. During such motion this entire assembly moves. As shown by FIG. 4, a fluid operated double-acting reciprocating motor 29 provides the power for shifting the assembly to and from the nozzle sealing and separating positions.

As shown by FIG. 5, the gear box 22 has full bearings 30 on one side and half bearings 31 on its other side, these bearings sliding on the tie rods 25. With this arrangement supporting the gear box 22, the injection and preplasticizing cylinders 11 and 14, respectively, and the preplasticizing screw 15, form a mechanically interconnected assembly which can reciprocate relative to the two crossheads and the tie rods 25 which interconnect these crossheads. The stroke of this reciprocation is long enough to open up the space between the plunger 12 in screw 15, to the full extent permitted by the injection cylinder 11, and of course this space must close to permit the injection phase. In addition to this, the stroke should be long enough as required to permit the injection cylinder 11 to be pulled completely off of the injection plunger 12.

With the plunger free from the injection cylinder 11, it is possible to swing the gear box 22 about the one of tie rods 25 engaged by the full bearings 30 so as to thus swing both cylinders and the screw to a laterally offset position permitting the screw 15 to be pulled from the cylinders through the now open end of the injection cylinder 11. An eye 32 is provided on the side of the gear box where the half bearings 31 are located, so that the hook of a hoist may be used to lift the assembly and swingingly shift it to its laterally offset position.

The above feature is important in the practical operation of the machine. Servicing, such as cleaning or replacement of the screw 15, or changing of the cylinders, is made quick and easy.

To make certain of alignment between the plunger 12 and cylinder 11, the forward end of the long cylinder forming the two cylinders 11 and 14, is provided with an aligning crosshead 33 having full bearings 34 sliding on the one of tie rods on which the gear box's full bearings 30 slide, and a half bearing 35 sliding on the other tie rod. This crosshead has an opening 36 which is slightly larger in diameter than the outside diameter of the long cylinder, and three or more interspaced screws 37 bear against the cylinder and provide for adjustment as required to effect alignment between the injection cylinder 11 and its plunger 12. This crosshead 33 swings with the rest of the assembly during the lateral shifting or swinging described hereinabove.

As shown by FIG. 6, the gear box 22 includes a rigid housing 38, extending upwardly from an adequately massive socket 39 mounted rotatively at the lower portion of the housing 38 by suitable sized bearings 40. The screw 15 has a butt 41 which slides in this pocket 39 to which it is fixed against relative rotation by a key 42. The back end of the socket is closed by a block 43 which transmits the screw's thrust to the socket 39 which then transmits the thrust through heavy duty thrust bearings 44 to an adequately massive thrust block 45. Removal of the screw 15 is effected simply by pulling it from the socket 39.

Rotation of the socket 39 is effected by a gear train 46 providing a suitable gear reduction and interconnecting the socket 39 with a constant torque motor 47. The latter is offset laterally with respect to the socket 39.

Now this motor 47 is one of the commercially available hydraulic motors of the rotary type. When supplied with hydraulic fluid under a constant pressure such a motor provides a constant torque regardless of its relative speed. At an adjustable torque load limit it stalls and while in its stalled condition it continues to apply its constant torque.

The advantage of this constant torque motor, or other means for applying constant torque to the screw 15, is that with a continuous supply of plastic, such as can be fed by a hopper 48 to the screw 15, the latter can, with adequate torque, screw the plastic through the preplasticizing cylinder and into the injection cylinder 11. As the space within the latter fills, the gear box 22 and all of its parts mechanically connected with this gear box, are pumped backwardly or to the right. The limit of this backward pumping is set by a screw 49 equipped with handles 50 and screwed through a threaded hole formed through the crosshead 26 in alignment with the big block 45 which accepts the thrust from the thrust bearing 44. The screw 51 serves to lock the screw 49 after it has been adjusted, the degree of adjustment depending on the volume of the plastic to be charged in the preplasticizing cylinder.

As the parts are pumped back by the pressure of the preplasticized plastic being continuously charged in the preplasticizing cylinder 11, the block 45 ultimately engages the screw 49 and its further motion is thus positively halted. Consequently, since the screw can no longer displace the plastic the torque required to turn it climbs until the motor 47 stalls. The motor however, maintains its torque on the screw. Therefore, during the subsequent injection stroke, the screw is locked against backwards rotation so that it positively blocks the rear end of the injection cylinder regardless of whether or not a valve is located between the two cylinders. The elimination of the need for such a valve is important because valves handling hot plastic under high pressure are expensive to build and service.

The forward stroke of the assembly required for injection is effected by a pair of hydraulic cylinders 52 containing double-acting pistons (not shown) having connecting rods 53 which project forwardly through openings in the crosshead 26 to which the cylinders 52 are firmly fixed. The screw 49 registers with the center of the block 45 and is located on the axis of the screw and the two cylinders, and the connecting rods 53 engage the block 45 symmetrically on opposite sides of the screw 49. The tie rods 25 are symmetrically disposed on either side of the mentioned axis and are parallel to this axis. Thus all of the stresses are uniformly distributed in a balanced manner.

The connecting rods 53 may be connected with the block 45 so that the assembly may be pulled back to pull the injection cylinder 11 completely from the plunger 12. If other means are provided for pulling back the assembly the connecting rods 53 need only push on the block 45, keeping in mind that during the continuous operation of the machine the parts are pumped back by the plastic as described before.

As shown by FIG. 4, a graduated bar 54 is adjustably secured to the crosshead 26 and an electric limit switch 55 may be connected in the usual electric control circuit to stop the motor 47 when such an action is desired. For example, this may be desirable if the motor 47 is replaced by some other kind of motor, or if it is desired to limit the pressure maintained on the charge in the injection cylinder 11 prior to the injection action.

As disclosed and claimed by the R. W. Dinzl Patent 2,493,805, issued January 10, 1950, the charging of preplasticized plastic in the injection cylinder when the space within the latter is at its minimum, so that the injection plunger and cylinder are pumped apart, has various advantages. This action is obtained to a degree with the present invention because as the screw 15 charges the plastic, it pumps the injection cylinder 11 away from the injection plunger 12 under the counter-pressure developed by the displacement of liquid from the cylinder 52 which necessarily fills these cylinders during the injection stroke.

Alternately, it may be desirable to maintain a positive pressure on the liquid in these cylinders 52 so that an even greater pressure is maintained on the plastic as it screws through the preplasticizing cylinder, gradually preplasticizers and charges as preplasticized plastic in the injection cylinder. In such instances the nozzle 10 may dribble plastic, since this nozzle will at that time be ordinarily retracted from the sprue 8 as the mold is opened to remove a previously molded part.

With the above in mind, as shown in detail by FIG. 3, the injection plunger 12 is provided with a flange 56 by which it is removably fastened by screws 57 in a recess formed in the crosshead 23. A plug valve 58 is fastened to the front of this crosshead and contains a straight through passage 59 connecting the passage 13 with the nozzle 10. This nozzle is screwed into the forward end of the valve 58, the latter providing a means for connecting the nozzle 10 with the passage 13. The plug 60 of this valve 58 forms a part of the passage 59 excepting when turned to block this passage. As shown by FIG. 7, a double-acting fluid motor 61 connects with a lever 62 attached to the lower end of the plug's shaft 63. Control of the fluid to this motor 61 opens and shuts the valve for appropriate rotation of the block 60. With the valve closed there is no chance for nozzle leakage during the charging of the injection cylinder 11.

To assure structural rigidity, a crossmember 64 has clamps fastened on the tie rods 25, and it is rigidly connected with a base 64a on which the crosshead pedestal portion is secured for sliding on the guide way 28. This crossmember has an opening 65 providing clearance for those parts which are swung out when servicing the injection and preplasticizing cylinder and screw.

Thermoplastics may require the addition of materials for imparting different colors to the molded product. The mixing of these materials with the plastic is ordinarily done by the manufacturer of the plastic. It would be less expensive if the molder using the injection molding machine could do his own color mixing and blending of different materials.

The modification illustrated by FIGS. 8 through 12 provides this mixing advantage.

In this modification the preplasticizing cylinder 14a is screwed to the body 66 of a plug valve, and the injection cylinder 11a is screwed to the opposite side of this valve in axial alignment with the preplasticizing cylinder 14a. The parts are provided with flanges 67 and 68, respectively, and screws 69 connect these flanges with the body of the plug valve 66.

This modification may be made with the length of the cylinder 14a reduced to provide room for the plug valve 66 and so that the overall length is the same as the overall length of the cylinders 11 and 14 previously described. Both assemblies may have generally corresponding flanges 70 which may be screwed to the outside of the gear box 22. When the latter is swung to its offset, interchange between the two types of assemblies may be easily accomplished.

Now in this modification the screw 15a is shorter than the screw 15 and its thread 16a at its forward end changes pitch to a degree approaching parallelism with the screw's axis and is formed into mixing blades 16b of the Banbury mixer type. This is shown by FIGS. 11 and 12 which illustrate the characteristic Banbury shape wherein the blades produce a wedge of material which is jammed against the cylinder and wedged through a slight space between the edges of the blades 16b and the inside of the cylinder. A large amount of shear occurs within the plastic material, providing for a repeated tearing apart and kneading action providing a good mixing effect. The screw maintains the feed of the material through the mixing zone.

With appropriate plastic mixtures, which may include coloring, fed to the screw 15a extensive mixing occurs in the fashion described. With the plastic material preplasticized and thoroughly mixed, and mixing may be of advantage in instances even when the molder is not mixing his own material, the material is forced by the screw 15a through the passage 71 of the valve 66 and, when its block 72 is in open position on into the injection cylinder 11a in which the plunger 12 is fitted. The pump back action previously described occurs in this instance also. The mixing action may be so great as to unduly heat the material, in which case the left-hand end of the cylinder 14a may be cooled.

The valve 66 serves to positively block off the rear end of the injection cylinder 11a during the injection phase, the plug 72 being turned to closed position at that time. This may be desirable because the shortness of the screw 15a introduces the possibility of backward leakage of the plastic during the injection stroke, even though the screw 15a is locked against backward rotation at that time.

The shaft 73 of the valve's plug 72 is shown as being turned by a double-acting linear motor 74 which connects with a lever 75 fixed to this shaft 73. The limit switches 76 operated by the cam 77 on the upper end of the valve's shaft 73, are used when the valve 66 is operated automatically in conjunction with fully automatic operation of the machine by control circuits and the like which are not illustrated. In such instances corresponding arrangements may be used for the valve 58. In general, the new machine is adapted to be fully controlled automatically throughout its injection and charging phases, just as is any other modern injection molding machine.

It can be seen that the new machine described hereinabove permits rapid charging of large volumes of preplasticized plastic into its injection cylinder and the injection of such large volumes into the mold. All of the parts are accessible for the application of external electric heaters in the usual fashion. For example, as shown by FIG. 3 the valve 58 has applied to it sections of conventional wrap-around electric heaters 78. Obviously the nozzle may be heated if desired. Because the plunger is stationary and easily accessible, any conventional heating means may be installed within the plunger to heat it internally when desired. There are no telescoping parts between the source of heat and the plastic in any instance. The large screw permits any of the known plastic compositions to be handled by the machine.

In addition to all of these advantages the new machine has a construction easily accommodating the large stresses involved by its operation. All of the stressed parts are symmetrically heated with respect to the center line extending on the axis of the cylinders and screw and with respect to the two tie rods. Because all of the plastic containing parts may be shifted laterally away from this center line of the machine very quickly, cleaning, screw and plunger replacement and servicing, cylinder changing and the like are free from complications.

In injection molding the object is to inject a shot of properly plasticized plastic having just the right volume to fill fully the cavity space of the die used to form the product desired. This may be effected even if the valve 66 is not used and there is some backward leakage of the plastic through clearance between the screw and its cylinder 14. However, this requires information concerning the leakage volume thus involved, and the supply of enough extra plastic to the injection cylinder 11 to compensate for the loss of this volume during injection.

For the above or other reasons it may be desirable in some instances to keep the screw rotating during the injection phase of operations. Thus, the constant torque motor may be set to deliver a higher torque or it may be substituted by any other kind of motor.

Preferably the plasticized charge is accurately metered into the injection cylinder, as by any of the measuring arrangements previously described. The backward loss must then be positively prevented during injection.

Backward leakage over the screw is particularly possible when the machine is working with plastics that have very low viscosity when properly plasticized, nylon being an example. This indicates the need for the valve 66 or its equivalent. Prior art machines have used check valves which rotate with the screw and therefor present maintenance problems.

A new check valve, shown by FIGS. 13 through 16, has been devised for the present new machine, for use when backward leakage occurs and the valve 66, with its need for timed operations, is not desired.

This new valve comprises a circular mount 80 fitted in the cylinder 14a, which corresponds to either of the cylinders 14 or 14a, at a location representing the inner end of the cylinder 11b in which the plastic charge is metered. This mount has axially extending plastic passages 81, in the form of slots, in its periphery, and is rigidly mounted by set screws 82 screwed through radial holes 83 formed in the cylinder 14b, and having internal screw threads. An annular floating valve head 84 has a circular periphery slidably fitting in the cylinder. The mutually opposing faces 80a and 84a of the mount and valve head respectively, and the cross-section of the passages 81, are contoured so that when the head and mount are spaced, backward flow of plastic through the space between them and through the passages results in increased flow velocity as compared to the flow velocity in front of the valve body. Then due to the pressure drop behind this body it moves backwardly and closes the passages 81 to prevent backward flow, the two faces 80a and 84a seating together substantially fluid-tightly.

Excessive forward motion of the valve head 84 is prevented by a second mount 84 spaced from the first mount 80 to limit the valve head motion to movement between fully open and closed positions. Set screws 86 screwed through internally threaded holes 87 in the cylinder 11b, rigidly fix this mount 80 in position.

Resistance to twisting by either mount is provided by a heavy bar 88 located on the axis of the parts and screwed tightly in a threaded hole 89 in the mount 80 and extending from and as an integral part of the mount 85. The latter has axially extending openings 91 of larger overall cross-sectional area than that of the slots 81 in the mount 80. This permits the backward plastic flow to close the valve head 84. The passage through the latter is of a venturi shape to provide a flow velocity increase when the plastic flows backwardly. Valve closing should occur almost immediately with backward plastic flow, to trap the metered plastic volume for the discharge or injecting action into the die cavity.

The plastic shot or charge is metered by the volume enclosed not only by the space between the mount 85 and the piston or plunger 12, but also by that of the passages 91 and the space between the mounts and up to the closed surfaces 80a and 84a. These surfaces close promptly when the injection action starts.

FIG. 17 shows another modification which provides for the injection of accurately metered charges by preventing backward plastic flow during injection.

In this FIG. 17 modification, the cylinder 14c corresponds generally to the cylinder 14a. The screw under the feed opening connecting with the source of unplasticized plastic, has a screw blade 92 having a pitch providing a positive feeding action which forces the plastic particles into the preplasticizing cylinder 14c. This portion of the screw works in what can be called a hopper or feed cylinder 92a.

Within the cylinder 14c the screw has blades 93 of the Banbury mixer type. In other words, these blades have a small clearance from the inside of the cylinder to form a space which the wedge shaped blades force the plastic to pass or, in effect, squirt through, thus to impart the maximum possible shear action to the plastic which puts work in the latter and thus creates heat internally within the plastic. Heaters 94 heat the cylinder 14c externally. These blades 93 may be designed for maximum shear action regardless of feeding action, because as more plastic is fed by the screw blade 92 it pushes that within the cylinder 14c forwardly.

The screw terminates beyond the blades 93 by a portion having a screw blade 95 which fits the inside of the cylinder 14c with very little clearance, and which is sufficiently long so that with its relatively close fit with the cylinder's interior, plasticized plastic cannot flow between the outer periphery or edge of this blade and the cylinder. This blade 95 has a pitch also providing a positive feeding action so it helps to remove plastic from the zone where the blades 93 are located, as well as sealing the metered plastic charge against loss during injection action.

The screw delivers the plastic to the injection cylinder 11a, of which only its flange 68 is shown, through a connection 96 having an interior that tapers to an orifice member 97 which is replaceable by others having orifices of different sizes. By using various ones of these members 97, various degrees of back pressure may be put on the plastic being fed and worked by the screw.

This screw, last described, may be an assembly of parts if desired. This entire unit has a flange 70a which, like the flange 70, may be used for attachment to the gear box 22. The connection 96 provides for the use of a thermocouple 98 to check the temperature of the delivered plastic, and has a threaded opening 99 providing for the mounting of a fluid pressure transducer, to check the plastic pressure. The injection pressure may also be determined by such a transducer.

With this FIG. 17 modification the one screw element may be used for a wide range of plastic compositions. Ordinarily a mixer screw must be designed for one or only a few compositions, because the pitch of the screw blade determines the length of time the material is worked and also the amount of shear, or work, placed in the material to heat it. A screw fitting one composition may overheat or underheat another composition.

When using this modification, the plastic remains in the working zone of the blade 93 until more plastic is fed through the hopper opening 91 to push that in this zone forwardly. The blade 93 has little or no forward feeding action. By controlling the amount of plastic fed it becomes possible to control the dwell or residence time of the plastic in the zone where the blades 93 work.

Other modifications may be developed, and the various constructions disclosed may be varied in design to do the same things in the same ways described.

We claim:

1. A preplasticizing injection molding machine including an injection cylinder and plunger, the latter extending through one end of the cylinder and having a longitudinally extending plastic passageway, a preplasticizing cylinder having a connection with the other end of said injection cylinder and a screw located in this preplasticizing cylinder for forcing plastic therethrough and into said injection cylinder, said preplasticizing cylinder and screw being non-reciprocative relative to each other, said preplasticizing cylinder and screw and said injection cylinder being interconnected mechanically and forming a reciprocative assembly, means for holding said injection plunger non-reciprocatively, means for rotating said screw to charge said injection cylinder with preplasticized plastic, and means for moving said assembly towards said injection plunger to force the preplasticized plastic through said passageway from said injection cylinder.

2. The machine of claim 1 and including means for holding said screw against backward rotation while said assembly is moving towards said injection plunger.

3. The machine of claim 1 and including a valve located in the plastic connection between said preplasticizing and injection cylinders, said valve being adapted to be closed while said assembly is moving towards said injection cylinder.

4. The machine of claim 1 and including a mixing chamber located in axial alignment with said preplasticizing cylinder between the latter and said injection cylinder, and mixing blades located in said mixing chamber and mounted on the end of said screw for rotation thereby.

5. The machine of claim 4 in which said mixing blades are of the Banbury mixer type.

6. The machine of claim 4 and including a valve located in the plastic connection between said preplasticizing and injection cylinders, said valve being adapted to be closed while said assembly is moving towards said injection cylinder.

7. The machine of claim 1 and in which said screw is removable from the forward end of said preplasticizing cylinder, and said assembly is movable laterally so that it may be moved free from interference by said injection cylinder for removal of this screw.

8. The machine of claim 1 and including a motor for rotating said screw and offset laterally therefrom, and a gear box on which said motor is mounted and interconnecting it and said screw, said preplasticizing cylinder having its back end connected to said gear box and the latter, being connected with and forming a part of said reciprocating assembly, and means for mounting the latter in a laterally shiftable manner so that it may be moved to a laterally offset location with respect to said injection cylinder, said screw being free to disconnect from said gearing in a forward direction.

9. The machine of claim 8 and including an adjustable abutment located to engage and stop the backward travel of said assembly, said screw rotating means being a constant torque motor capable of stalling while maintaining its constant torque on said screw.

10. A screw type preplasticizing plastic injection molding machine including two interspaced mutually parallel crossheads, two laterally interspaced mutually parallel tie rods interconnecting said crossheads and forming an assembly having a longitudinal center line symmetrically located between said tie rods, a gear box having linear motion bearings mounting it on said tie rods, a socket facing a first one of said crossheads and journaled by rotative bearings in said gear box, a rotative thrust bearing in said gear box and located to take thrust from said socket and having an external thrust block facing the second of said crossheads, a preplasticizing and injection cylinder unit mounted on said gear box and extending therefrom towards said first crosshead, the preplasticizing and injection cylinder being open at the end furthest from the gear box so as to receive a plunger and permit the screw to be withdrawn, a plastic feed screw located in said preplasticizing cylinder and having an end removably inserted in said socket and removably keyed to the latter, an injection plunger mounted on said first crosshead and slidably fitting in said injection cylinder, said socket, thrust block, cylinders and screw being symmetrically located with respect to said center line, a rotary motor mounted on said gear box and a gear train within said box and rotatively interconnecting said motor and said socket, said gear box and said parts mounted thereon forming an assembly that is reciprocative relative to the first-named assembly to effect relative reciprocation between said injection cylinder and said injection plunger, the latter having a longitudinally extending plastic passageway, and means for appying thrust to said thrust block in a direction towards said first crosshead, said preplasticizing cylinder having means for feeding plastic continuously thereto for screwing forwardly into said injection cylinder, the two cylinders being interconnected for plastic flow therebetween.

11. The machine of claim 10 in which said linear sliding bearings on one of said tie rods is laterally separable therefrom so that said gear box and said parts mounted thereon may be swung laterally about the other of said tie rods when the second-named assembly is moved away from said first crosshead far enough to separate said injection cylinder from its said plunger.

12. A screw preplasticizing injection molding machine including a cylinder having a closely fitting rotative screw therein for advancing plastic material therethrough, said screw being non-reciprocative relative to said cylinder, a hollow nozzle carrying plunger received into said cylinder ahead of said screw, said plunger being reciprocative relative to said cylinder, means for receiving plastic material and for rotating said screw to advance said material to ahead of said screw between the latter and said plunger, and means for causing said cylinder and screw and said plunger to move towards each other whereby said plastic material is forced from said cylinder through said plunger.

13. A screw preplasticizing injection molding machine including a cylinder having a closely fitting screw therein for advancing plastic material therethrough, means for holding said screw non-reciprocative relative to said cylinder, a stationary hollow plunger received into said cylinder just ahead of said screw, said plunger being reciprocative to said cylinder, means for receiving plastic material and for rotating said screw to advance said material to ahead of said screw, means for moving said cylinder and screw toward said stationary plunger whereby said plastic material is compressed within and forced from said cylinder through said plunger, and means connecting said plunger to a nozzle suitable for injecting into a mold sprue.

14. A screw preplasticizing injection molding machine including two interspaced mutually parallel crossheads, two laterally interspaced mutualy parallel tie rods interconnecting said crossheads, a screw preplasticizing assembly riding on said tie rods and having a cylinder with a closely fitting removable screw therein for advancing plastic material therethrough, said cylinder being open at the head end thereof, and said screw being removable through said head end, said removable screw being non-reciprocative relative to said cylinder in operation, a hollow plunger closely fitting into said open head end of said cylinder in operation, said plunger being reciprocable with respect to said cylinder, said screw preplasticizing assembly being rotatable around one of said tie rods to swing free from said plunger when pulled apart from said plunger, means for rotating said screw and for moving said cylinder and screw toward and from said plunger in operation, and for moving said cylinder apart from said plunger whereby plastic material may be compressed in and forced from said cylinder in front of said screw and whereby said assembly may be pulled apart and rotated about one tie rod for removal of the screw.

15. A screw preplasticizing injection molding machine including two interspaced mutually parallel crossheads, two laterally interspaced mutually parallel tie rods interconnecting said crossheads, a screw preplasticizing assembly riding on said tie rods and having a cylinder with a closely fitting removable screw therein for advancing plastic material therethrough, said cylinder being open at the head end thereof, said screw being removable through said head end, said removable screw being nonreciprocative relative to said cylinder in operation, means for rotating said screw, a stationary hollow plunger closely fitting into said open head end of said cylinder in operation, said plunger being reciprocable with respect to said cylinder, means for reciprocating said assembly on said tie rods whereby plastic material may be compressed in and forced from said cylinder in front of said screw and whereby said assembly may be pulled apart and rotated about one tie rod for removal of the screw.

16. In a screw plasticizing plastic injection molding machine, means for receiving plastic material, a screw for screwing said plastic material into a reservoir column at the head of said screw and means for operating said screw, a cylinder about said screw and extending to receive said reservoir column, a plunger defining a bore and being connected to a nozzle, and means for causing said plunger to forceably enter said cylinder ahead of said screw and against said reservoir column to force the plastic material out through the bore and nozzle while said reservoir column remains substantially stationary with respect to said cylinder.

References Cited in the file of this patent

UNITED STATES PATENTS

| | | |
|---|---|---|
| 1,021,938 | MacKay | Apr. 2, 1912 |
| 2,202,140 | Burroughs | May 28, 1940 |
| 2,519,014 | Bankey | Aug. 15, 1950 |
| 2,765,491 | Magerkurth | Oct. 9, 1956 |
| 2,804,649 | Hupfield | Sept. 3, 1957 |
| 2,944,288 | Sherman | July 12, 1960 |
| 2,950,501 | Harkinrider | Aug. 30, 1960 |
| 3,020,591 | Brether et al. | Feb. 13, 1962 |
| 3,108,326 | Thiel | Oct. 29, 1963 |

FOREIGN PATENTS

| | | |
|---|---|---|
| 573,740 | Canada | Apr. 7, 1959 |
| 1,198,636 | France | Dec. 8, 1959 |
| 555,379 | Italy | June 23, 1957 |

OTHER REFERENCES

Rubber and Plastics Age, "New Peco Injection Moulding Machine," April 1961.